May 25, 1965  R. L. HILLIER  3,184,905
GRAIN HARVESTER
Filed May 25, 1964  5 Sheets-Sheet 2

FIG-2

INVENTOR.
RAMON L. HILLIER
BY Lothrop & West
ATTORNEYS

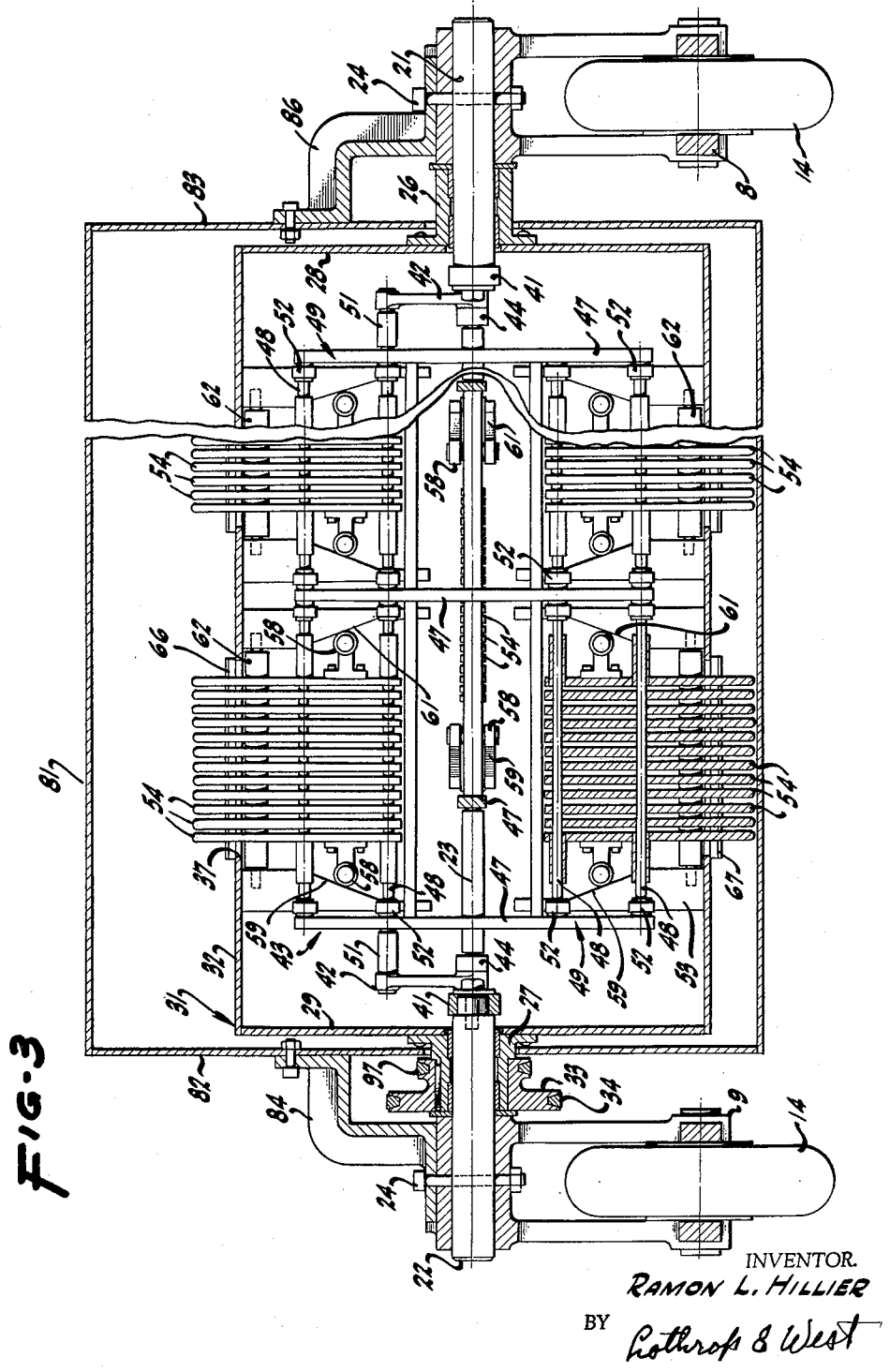

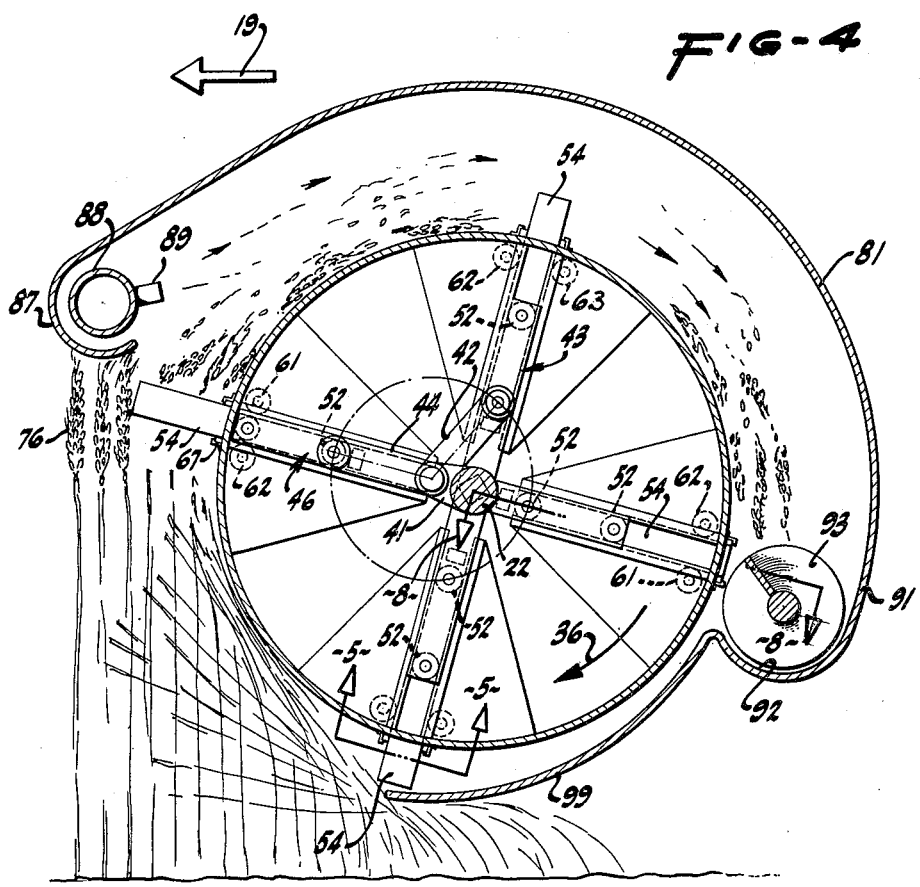
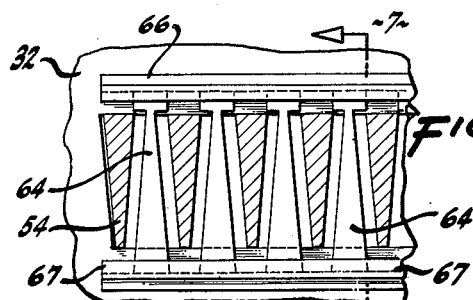
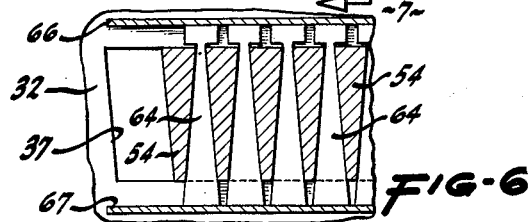
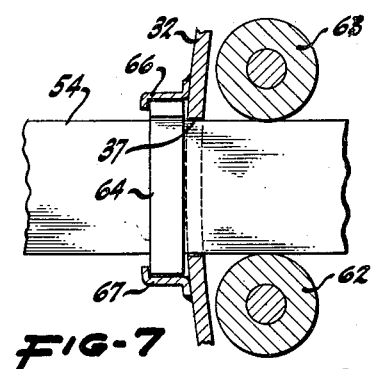
INVENTOR.
RAMON L. HILLIER
BY Lothrop & West
ATTORNEYS INVENTOR.
RAMON L. HILLIER
BY
Lothrop & West
ATTORNEYS

United States Patent Office 3,184,905
Patented May 25, 1965

3,184,905
GRAIN HARVESTER
Ramon L. Hillier, 827 33rd St., Sacramento, Calif.
Filed May 25, 1964, Ser. No. 369,668
10 Claims. (Cl. 56—130)

The invention relates primarily to means for havesting grain growing in a field and having a head at the top of a stalk, an exemplary grain being wheat. It is an object of the invention to provide a grain harvester which can be operated in the field and which will carefully harvest the grain by simultaneously separating the grain head from the grain stalk, retrieving the grain head and leaving substantially all of the stalk still remaining in the field.

Another object of the invention is to provide a grain harvester in which it is not necessary to cut or mow the grain stalks from the field in order to harvest the grain.

A still further object of the invention is to provide a grain harvester which is effective to strip the heads from the grain during the progress of the harvester in the field.

Another object of the invention is to provide a compact grain harvester in which substantially all of the available grain is received inside the harvester and is not lost upon the field.

Another object of the invention is to reduce the bulk of material that must be handled by a grain harvester.

Another object of the invention is in general to provide an improved grain harvester.

Other objects together with the foregoing are attained in the embodiment of the invention described in the accompanying description and illustrated in the accompanying drawings, in which:

FIGURE 2 is a cross section on an enlarged scale, the plane of section being indicated by the line 2—2 of FIGURE 1;

FIGURE 3 is a transverse cross section, the plane of which is indicated by the line 3—3 of FIGURE 2;

FIGURE 4 is a cross section, the plane of which is indicated by the line 4—4 of FIGURE 1;

FIGURE 5 is a cross section, the plane of which is indicated by the line 5—5 of FIGURE 4;

FIGURE 6 is a view to FIGURE 5, but showing the parts in a different relative location;

FIGURE 7 is a cross section, the plane of which is indicated by the line 7—7 of FIGURE 5;

Figure 1:
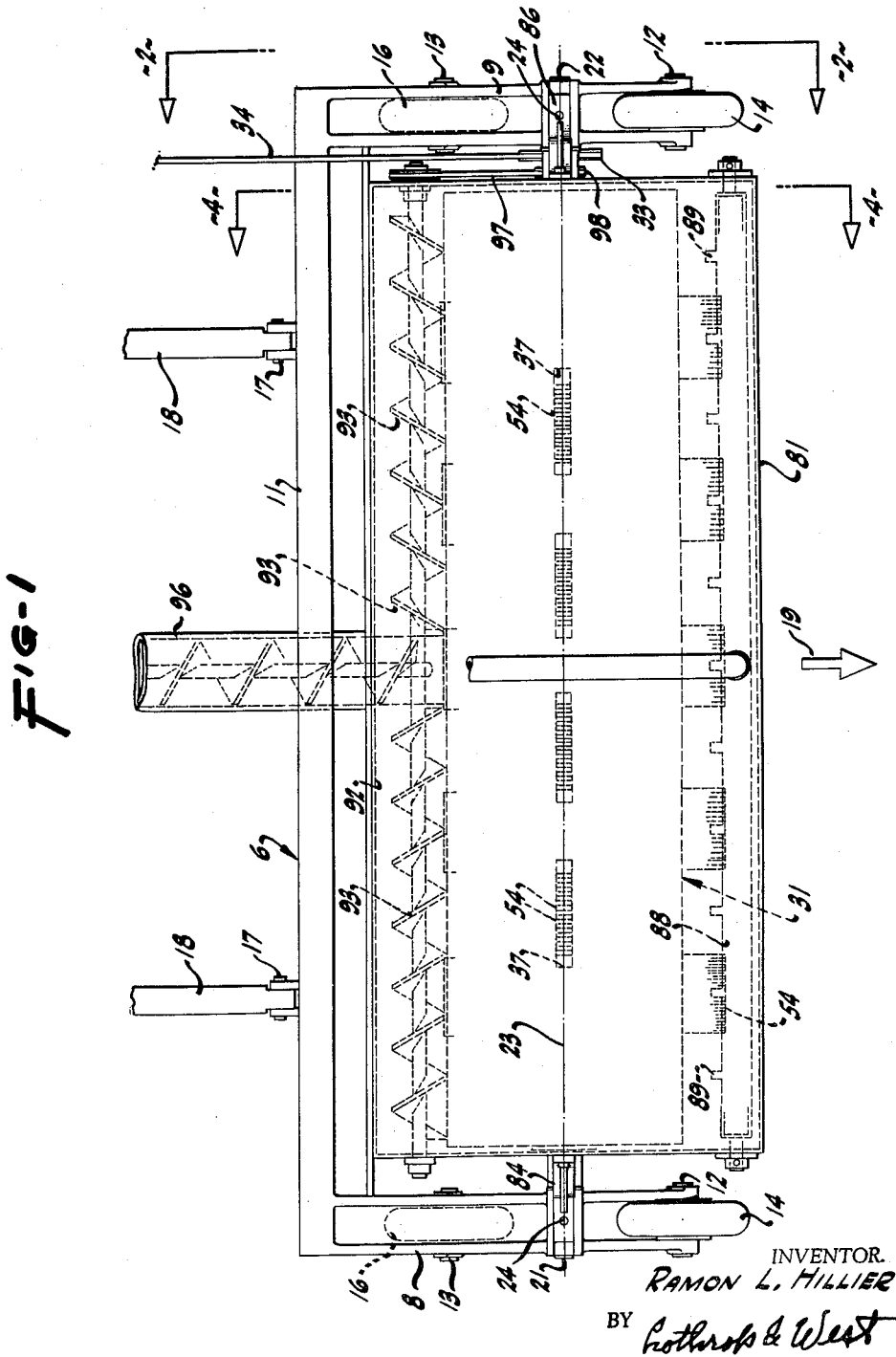
FIGURE 1 is a plan of a grain harvester constructed pursuant to the invention, the propulsion mechanism and some of the attendant structure being omitted to reduce the size of the figure.
Figure 8:
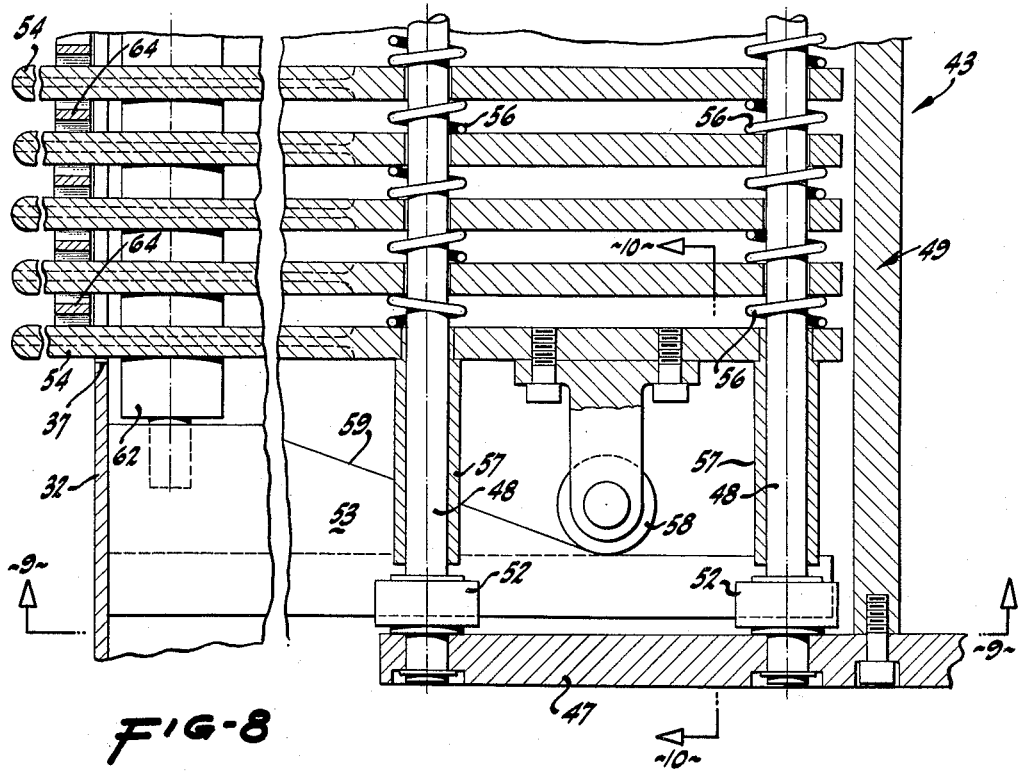
FIGURE 8 is a cross section, the plane of which is indicated by the line 8—8 of FIGURE 4.
Figure 9:
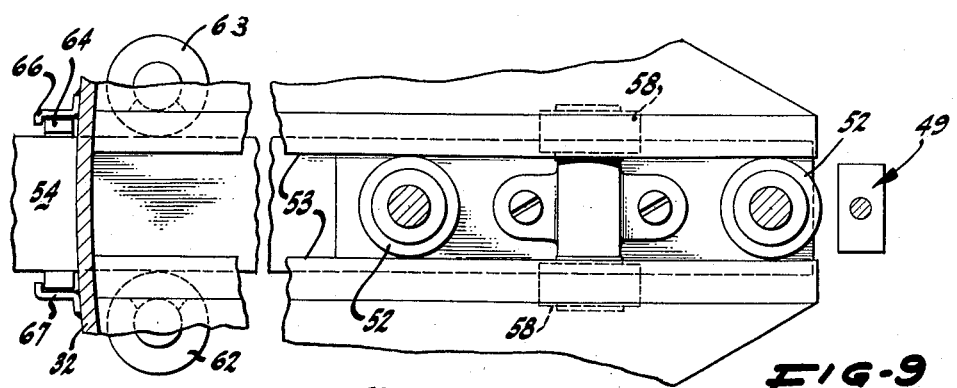
FIGURE 9 is a detailed view largely in cross section, the plane of which is indicated by the line 9—9 of FIGURE 8.
Figure 10:
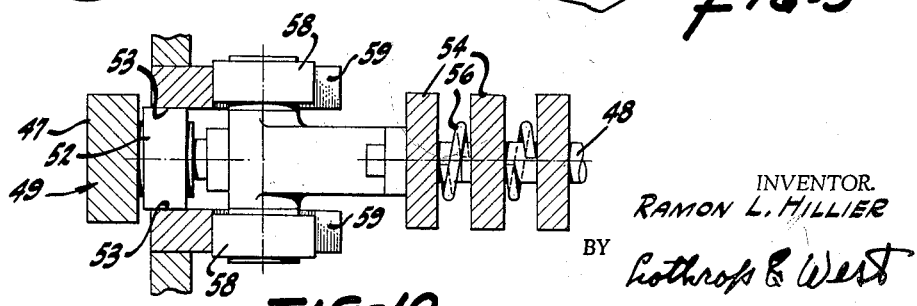
FIGURE 10 is a detailed view in cross section, the plane of which is indicated by the line 10—10 of FIGURE 8.

In its preferred form the grain harvester pursuant to the invention includes a main frame 6 appropriately fabricated of side members 8 and 9 and a cross frame 11. The side members are conveniently integral cast or structural parts provided with pairs of axles 12 and 13 on which ground-engaging wheels 14 and 16 are arranged in tandem. Preferably the ground-engaging wheels are pneumatically tired. The cross frame 11 is provided with a hitch 17 to receive the push frame 18 of a suitable propelling mechanism such as a tractor since the grain harvester is intended to advance in a field in the direction of the arrow 19 in FIGURE 1 as propelled by the tractor or other suitable source of power.

While a single harvester can be used and is preferably pushed in front of a tractor, it is contemplated that a number of similar harvesters may be arranged one at the front of the tractor with two more on opposite sides of the tractor. Also, a thresher can be pulled by the tractor. Harvested grain from all three harvesters can be conveyed to the thresher and all of the power requirements of the three harvesters and of the thresher can be supplied from the power plant that propels the tractor. In this fashion, a one-man operation can be conducted.

The stub shafts 21 and 22 project inwardly toward each other along a transverse horizontal axis 23. The stub shafts are anchored against rotation in the frames 8 and 9 by through bolts 24. Journalled on the stub shafts 21 and 22 by means of appropriate hubs 26 and 27 are end plates 28 and 29 included in a drum generally designated 31 and completed by a circular-cylindrical outer sheet or shell 32 secured to the end plates 28 and 29. In order that the drum may be rotated about the axis 23, the hub 27 for example is provided with a driven pulley 33 joined by a belt 34 to a suitable source of driving power on the tractor (not shown). The drum is revolved in the direction of the arrow 36 so that the lower portion of the drum progresses forwardly in the direction of advance 19 of the frame. The drum is provided with a number of openings 37 in the shell 32, the openings being preferably in the form of transversely extending slots arranged partially in alignment with each other transversely of the drum and also arranged in staggered and overlapping relationship as particularly shown in FIGURE 1.

Disposed within opposite ends of the drum and extending parallel to the axis 23 is a pair of stationary cranks 41 secured against rotation on the stub shafts 21 and 22, respectively. The pair of cranks is connected by a pair of links 42 to one slide mechanism 43 and by a pair of links 44 to another slide mechanism 46. The slide mechanisms are virtually identical so the description of one applies to the other.

The slide mechanism 43 includes diametrical frame members 47 joined by longitudinal rods 48 to provide an oscillating frame 49. A pair of crank pins 51 join the oscillating frame to the links 42. The frame 49 is supported by rollers 52 on the rods 48 running on tracks 53 formed by the edges of supports extending inwardly from the shell 32. The slide mechanism 46 is similarly constituted but is disposed at right angles to the slide mechanism 43. Their respective oscillating frames therefore reciprocate ninety degrees out of phase with each other.

Mounted in groups on the rods 48 are harvesting fingers 54. These are generally rectangular, extended members pierced to slide laterally along the rods 48 and are urged apart by spring 56. The end fingers 54 of each group are additionally provided with guide tubes 57 slidable on the rods in order to take some side thrust from end cam rollers 58 running against outwardly converging radial cams 59 and 61 on the sides of the tracks 53.

The groups of fingers 54 are arranged in staggered and overlapping arrangement so as to project through the openings 37 in the shell 32. To assist in supporting the fingers, pairs of longitudinal rollers 62 and 63 are disposed on the shell alongside the openings 37.

The outermost, projecting ends of the fingers are trapezoidal in cross section (FIGURES 5 and 6) with the widest part upwardly. As they emerge from the drum 31, the fingers pass between T-shape barriers 64 (FIGURE 7) freely slidable in transverse directions and supported in guides 66 and 67 on the outer face of the drum alongside the openings 37.

As the drum is revolved and since the crank shaft 41 is held stationary despite such revolution of the drum, the various fingers 54 are simultaneously revolved. As they turn, the links 42 and 44 cause reciprocation of the frames 49 with respect to the axis 23 so that the fingers are projected from the drum and retracted into the drum as the drum revolves. The position of the cranks and of the crank links 42 and 44 is such that as the drum revolves the fingers begin to project at the back of the drum and then continue to project until the drum has made substantially a half revolution. At this time the pairs of fingers are at the front of the drum. Thereafter they retract as they complete the circuit.

As the fingers project, they are moved from their spaced-apart positions into positions adjacent each other since the rollers 58 ride along the cams 59 and 61. This causes the fingers to approach each other and compress the springs 56 as the fingers move together. During this motion, the various fingers move toward each other in a transverse direction and pinch or grasp any grain stalks which have been engaged between them during the advance of the frame. The amount of approach is limited by the barriers 64. In practice a final gap of one-eighth inch is satisfactory. The grain stalks are hollow and can deform if necessary without harm. This pinching movement of the stalks is also accompanied by an upward movement of the fingers so that as the fingers reach and approach the grain heads 76 the heads are stripped off of the stalks and the grain heads are brought into the interior of the machine.

In order to conserve and house the detached and withdrawn grain heads, the frame is provided with a housing 81 of generally arcuate contour beginning in advance of the drum and extending over the top thereof. The housing includes side sheets 82 and 83 supported on brackets 84 and 86 upstanding from the frames 8 and 9. At its forward end the housing 81 is provided with an inturned portion 87 within which an air duct 88 is disposed. Air under pressure from a suitable source on the tractor (not shown) is supplied through the duct and is discharged through a plurality of nozzles 89 thereon in a direction tending to blow the detached grain into the machine over the drum and within the housing. This motion of the grain is augmented by the rotation of the drum itself. The air jets from the nozzles 89 induce an influx of atmospheric air into the housing so as in effect to suck any shattered grain into the machine to save it.

During the rotation over the top of the drum, the fingers are again spread apart since the springs exert a spreading force thereon and the rollers retreat on the cam surfaces, thus releasing the grain heads from the grasp of the fingers. The released grain falls by gravity and under impetus of the air current into a grain receiving portion 91 of the housing 81. This is a transverse pocket 92 into which the grain can fall by gravity at a point at which the fingers are almost entirely retracted and are spread completely apart. Grain in the pocket 92 is discharged from the machine by means of a grain auger 93 extending transversely toward a central discharge auger in a duct 96 extending to an appropriate point of discharge. The augers 93 and 96 are driven by a belt 97 from a pulley 98 fastened onto the pulley 33. The contour of the housing is such in advance and below the pocket 91 as to form a guard or shroud 99 which stops short of the point of partial projection of the fingers which in that portion of travel of the structure are emerging from the surface of the drum and are gradually closing together to grasp the grain stalks and eventually to detach the grain heads 76.

What is claimed is:
1. A grain harvester comprising:
 (a) a wheeled frame adapted to be advanced in a field in a predetermined direction;
 (b) a drum rotatably mounted on said frame for rotation about a horizontal axis transverse to said direction, said drum including a plurality of rows of transversely extending slots, said slots in each of said rows being in alignment with each other;
 (c) means for rotating said drum as said frame advances;
 (d) a plurality of sets of grain stripping fingers disposed within said drum, each of said sets of fingers projecting radially through a corresponding one of said slots for reciprocating movement therethrough between a first, retracted position and a second, projected position, each of said sets including a plurality of spaced, parallel elongated fingers laterally movable between a first, expanded position and a second, contracted position;
 (e) means for reciprocating said sets between said first, retracted position and said second, projected position in dependence upon the angular, rotational position of said drum;
 (f) means for laterally moving said fingers between said first, expanded position and said second, contracted position in dependence upon the angular rotational position of said drum; and
 (g) a plurality of radially disposed, parallel barriers interposed between said fingers, said barriers being laterally movable with the adjacent of said fingers and being effective to maintain said adjacent fingers in parallel spaced relationship in said second, contracted position thereof.

2. The device of claim 1 wherein said slots in successive rows thereof are disposed in staggered and overlapping relationship.

3. The device of claim 1 wherein said drum is rotatably mounted at each end on a pair of shafts coincident with said horizontal axis, and wherein said finger set reciprocating means includes a radial crank mounted on one of said shafts, a radially movable slide mechanism mounted at one end on said finger set, and a link pivotally mounted on said crank at a location radially displaced from said axis and pivotally connected to the other end of said slide mechanism for radial reciprocating movement of said slide mechanism and said finger set as said drum, said finger set and said slide mechanism rotate about said horizontal axis.

4. The device of claim 1 wherein each of said fingers is characterized by being trapezoidal in cross-section with the wider base of the trapezoid being faced toward the direction of angular movement of said drum.

5. The device of claim 4 wherein each of said barriers includes a portion which is trapezoidal in cross-section with the narrower base of the trapezoid being disposed between the adjacent wider base portions of said fingers and wherein the sides of said barrier are in face to face engagement with the adjacent sides of said fingers in said second, contracted position thereof.

6. The device of claim 1 further characterized by a housing on said frame enclosing the upper and after portion of said drum; and blower means located adjacent the forward portion of said housing for furnishing a current of air flowing upwardly and rearwardly over the front and top of said drum.

7. A grain harvester comprising the combination of claim 6 plus means on said frame behind said drum and connected to said housing for receiving grain released by said finger sets and blown rearwardly through said housing by said blower means.

8. A grain harvester comprising:
 (a) a wheeled frame adapted to be advanced over a field;
 (b) a drum rotatably mounted on said frame for rotation about a first, transverse, horizontal axis, said drum including at least one transverse slot;
 (c) a stationary crank mounted on said frame and extending forwardly therefrom;
 (d) a link pivotally mounted on the end of said stationary crank for rotation about a second, transverse, horizontal axis;
 (e) a slide mechanism pivotally mounted at one end on said link and extending toward said slot, said slide mechanism being movable by said link toward and away from said slot as said link rotates about said second axis;
 (f) a plurality of spaced, parallel fingers on said slide mechanism and extending through said slot, said fingers being movable by said slide mechanism between a projected position and a retracted position in dependence upon the angular position of said link relative to said stationary crank;

(g) means for converging said fingers in parallel fashion as said fingers project and for spreading said fingers apart as said fingers retract; and, (h) barriers between said fingers for limiting the extent of convergence thereof to a predetermined spaced distance.

9. A grain harvester comprising:

(a) a frame movable forwardly in a field to be harvested;

(b) a drum rotatably mounted on said frame for rotation about a transverse, horizontal axis, said drum including a plurality of staggered, axially overlapping openings formed in the periphery thereof;

(c) a plurality of finger sets projecting through and substantially occupying said openings, said finger sets being radially movable with respect to said drum and being revolvable thereby as said drum is rotated about said axis;

(d) crank means mounted on said frame and connected to said finger sets for projecting and retracting said finger sets as said finger sets are revolved by said drum;

(e) means for axially converging the fingers of said sets as said finger sets project and for axially spreading the fingers of said sets as said finger sets retract; and (f) barrier means interposed between the outer portions of the fingers of said sets for limiting the extent of axial convergence of said fingers to a predetermined spaced amount.

10. The device of claim 9 further characterized by means for maintaining said fingers in parallel relation as said fingers move between converged and spread positions.

References Cited by the Examiner

UNITED STATES PATENTS

| | | | |
|---|---|---|---|
| 287,445 | 10/83 | Lamar | 171—56 X |
| 466,674 | 1/92 | Gatgens et al. | 171—54 |
| 885,897 | 4/08 | Weeks | 171—56 |
| 1,122,375 | 12/14 | Engle | 56—19 |
| 1,274,201 | 7/18 | Romero | 171—56 |
| 1,370,919 | 3/21 | Schaefer. | |
| 1,403,262 | 1/22 | Magill | 171—56 |
| 1,794,658 | 3/31 | Walsh. | |
| 2,513,430 | 7/50 | Scheid | 56—364 |
| 2,547,749 | 4/51 | Gray | 56—130 |

ANTONIO F. GUIDA, *Primary Examiner.*

RUSSEL R. KINSEY, *Examiner.*